United States Patent [19]

Neumann

[11] 4,098,568
[45] Jul. 4, 1978

[54] ROTARY CONVEYING APPARATUS

[75] Inventor: John W. Neumann, Birmingham, Mich.

[73] Assignee: Oxy Metal Industries Corporation, Detroit, Mich.

[21] Appl. No.: 743,765

[22] Filed: Nov. 22, 1976

[51] Int. Cl.² ............................................. F24J 3/00
[52] U.S. Cl. .................................. 432/230; 302/2 R; 432/231
[58] Field of Search ............... 432/230, 231; 302/2 R, 302/5 R

[56] References Cited

U.S. PATENT DOCUMENTS

| 3,782,791 | 1/1974 | Neumann et al. | 302/2 R |
| 3,873,163 | 3/1975 | Gladish | 302/2 R |

FOREIGN PATENT DOCUMENTS

| 1,286,161 | 1/1962 | France | 302/2 R |

Primary Examiner—John J. Camby
Attorney, Agent, or Firm—Harness, Dickey & Pierce

[57] ABSTRACT

A rotary conveying apparatus comprising a plurality of rails for supporting and conveying cup-shaped cylindrical articles on a cushion of fluid during their translatory movement from the inlet ends to the outlet ends of the rails. The apparatus incorporates a framework on which a plurality of the rails are mounted in longitudinally extending spaced substantially parallel relationship, with the inlet and outlet ends thereof arranged in a circular pattern at equal circumferentially spaced increments therearound. Each of the rails is formed with a plurality of cavities or ports in a supporting surface thereof, through which a fluid such as air is discharged against the surface of an article in a manner to support the article on a cushion of fluid in spaced relationship from the supporting surface. The rotary conveying device is continuously or intermittently rotated and transfer means are provided for transferring articles into the inlet ends of the rails in a sequential ordered sequence and receiving means are provided for receiving articles discharged from the outlet ends of the rails in a sequential ordered sequence. The articles, during conveyance along the rails between the inlet and outlet ends, can be subjected to one or a plurality of treatments such as, for example, a drying or curing of decorative coatings on the surfaces of the articles.

26 Claims, 24 Drawing Figures

ROTARY CONVEYING APPARATUS

BACKGROUND OF THE INVENTION

The present invention is particularly applicable, but not necessarily limited to the conveyance on a cushion of fluid of thin-walled cup-shaped circular cylindrical articles of the general type in widespread use for packaging various foodstuffs, including beverages and the like. Such tubular articles or containers are conveniently comprised of a variety of materials which provide for a thin-walled resilient construction, such as, for example, various plastic materials, tin-plated steel, plastic-lined steel, aluminum and the like. Typically, container bodies of aluminum are produced by deep-drawing or a draw and re-draw, or a draw and ironing of an aluminum blank employing modern automatic machines which are capable of production rates presently as high as about 200 container bodies per minute. The preliminarily formed container bodies are trimmed along their open upper edge and thereafter are subjected to various cleaning and coating operations before entering the filling and final sealing operation.

Suitable apparatuses and methods for effecting a high speed, efficient treatment of the surfaces of such container bodies are disclosed in U.S. Pat. Nos. 3,704,685 and 3,748,177, which are owned by the same assignee as the present invention. In accordance with the teachings of the aforementioned United States patents, longitudinally extending guide rods are provided for supporting the container bodies as they are propelled therealong in longitudinally spaced end-to-end relationship and the container bodies are subjected to a plural liquid treatment by the impingement of high pressure liquid solutions against the inner and outer surfaces thereof. A recent technological breakthrough in conveying devices for such container bodies is disclosed in U.S. Pat. No. 3,904,255, which also is assigned to the assignee of the present invention, and provides for a rail having a plurality of cavities therein through which air or fluid is discharged for supporting the container bodies on a cushion of fluid, facilitating their transport and coveyance due to the extremely low frictional characteristics of the fluid cushion. In accordance with the teachings of the aforementioned patent, the rail is stationarily supported and extends for a considerable length and is adapted to accommodate a plurality of the container bodies traveling therealong in spaced relationship while supported on the fluid cushion. The fluid cushion not only provides for a substantially frictionless transport system, but also prevents contact of the surfaces of the container bodies and the supporting structure so that a setting or drying of the treated surfaces can be effected without any marring or damage thereto.

It is conventional practice, after appropriate cleaning and surface conditioning of the container bodies, to subject them to a decorating or printing operation, whereby appropriate indicia are applied to the exterior side wall surfaces thereof. Decorating equipment of the type in widespread commercial use for effecting a high speed decoration of such container bodies is disclosed in U.S. Pat.Nos. 3,220,813; 3,220,833; 3,223,028; 3,227,070; 3,250,213; 3,300,019; 3,339,469; 3,371,603; 3,391,636; 3,616,778; 3,766,851; 3,774,905; 3,855,967 and 3,859,919, the substance of which are incorporated herein by reference. In accordance with the apparatuses disclosed in the aforementioned United States patents, container bodies are sequentially loaded on a plurality of support elements which are mounted on a rotatable carrier and are advanced at circumferentially spaced intervals past decorator printing heads which apply a decorative coating to the side wall surfaces of the undecorated containers. The decorative process may further include the application of a varnish overcoating on the underlying printed surface. In accordance with prior art practice, the decorated container bodies are thereafter transferred to a chain conveyor incorporating pins which extend into the interior of the container bodies, providing support during the course of their travel through a large curing oven to effect a drying and setting of the decorative printing and varnish overcoat. The long length of the conveyor chain, the high temperature to which it is subjected and the serpentine path of travel through the oven, has resulted in frequent breakdowns of the conveyor chain system due to inadequate lubrication, requiring excessive maintenance and repair and costly shutdowns of the line.

It is an objective of the present invention, in accordance with one of its embodiments, to provide a rotary fluid bearing conveyor system for tubular articles, such as container bodies, which is adapted to receive the decorated container bodies from the decorating printer and to effect a drying of the decorative printing and varnish overcoat while supported on a cushion of air, thereby obviating the need of a long pin-type chain conveyor and oven system and its associated problems.

SUMMARY OF THE INVENTION

The benefits and advantages of the present invention are achieved by a rotary conveying device for conveying cup-shaped cylindrical articles, such as container bodies, along a plurality of circumferentially disposed conveying rails while supported on a cushion of fluid, such as air. The apparatus comprises a framework on which the plurality of conveying rails are mounted in longitudinally extending spaced substantially parallel relationship and arranged with the inlet and outlet ends thereof on a circle in substantially equal circumferential spaced increments therearound. The framework is supported for rotary movement about an axis passing through the center of the circles on which the inlet and outlet ends of the rails are arranged and drive means are provided for rotating the framework and the rails in coordinated relationship with transfer means for transferring articles into the inlet ends of the rails in a sequential ordered sequence and with receiving means which receive the articles discharged from the outlet end of the rails in a sequential ordered sequence. The framework incorporates a plenum disposed in communication with a plurality of cavities formed in each of the rails, through which a fluid such as air is discharged against the surfaces of articles in a manner to support the articles in spaced relationship relative to the rail supporting surface by a fluid cushion. In the adaptation of the conveying device for a rotary drying operation, the fluid supplied to the supporting rails may be heated air, which effects a corresponding heating of the conveyed articles to effect a drying and/or a setting of any films or coatings on the surfaces thereof.

In accordance with a specific adaptation of the apparatus of the present invention, the rotary conveying device is employed as a dryer and is disposed at the output end of a rotary decorating apparatus for container bodies and is rotatably driven in coordinated relationship with the discharge of wet decorated container bodies from the supporting printing spindles, such that the articles are introduced into the inlet ends of the rails of the conveying device, whereby a setting and curing of the decorative coatings occurs while supported out of contact with the rails on a cushion of heated air during the course of their travel from the inlet end to the outlet end thereof.

It is further contemplated that the rotary conveying device may be comprised of a series of axially aligned sections through which the articles sequentially pass and wherein the articles are subjected to a preselected treatment in each section before discharge from the outlet ends of the rails.

The combination of a plurality of rails on the rotary framework provides for a high capacity compact conveying and/or drying apparatus for tubular articles, whereby substantial advantages are achieved over prior art conveying and drying devices heretofore known. Additional benefits and advantages of the present invention will become apparent upon a reading of the description of the preferred embodiments taken in conjunction with the accompanying drawings.

DESCRIPTION OF THE PREFERRED EMBODIMENTS

Figure 1:
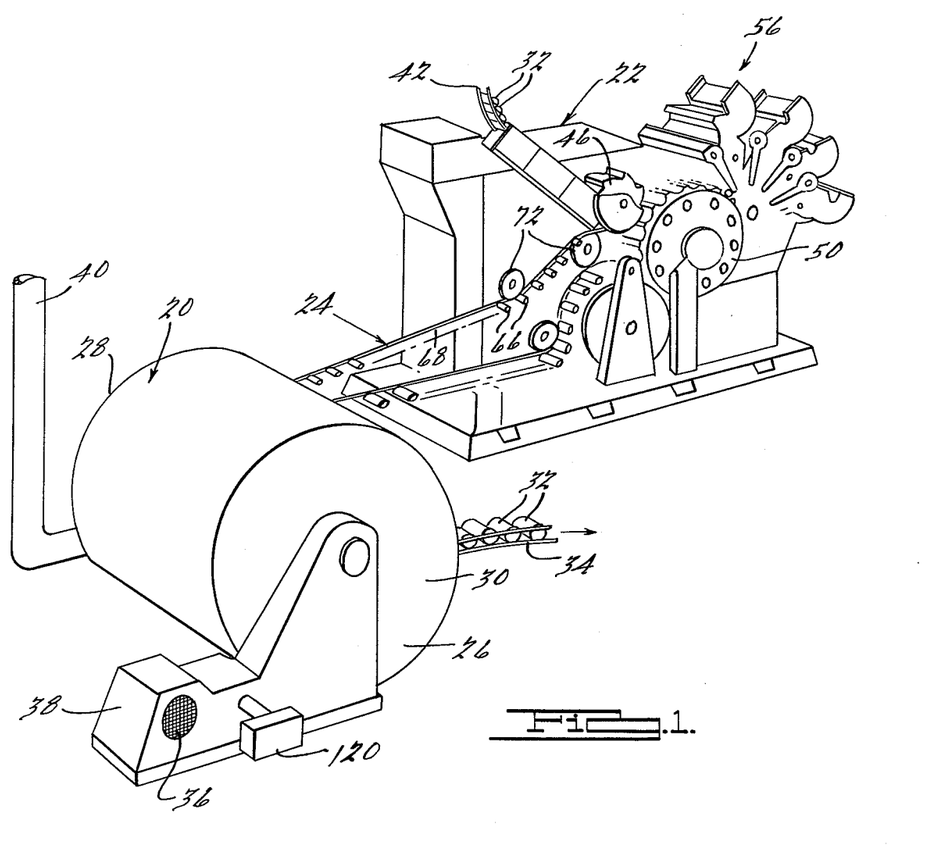
FIG. 1 is a perspective view, partly schematic, illustrating the present invention adapted as a rotary dryer for receiving decorated container bodies from a rotary decorating apparatus.
Figure 2:
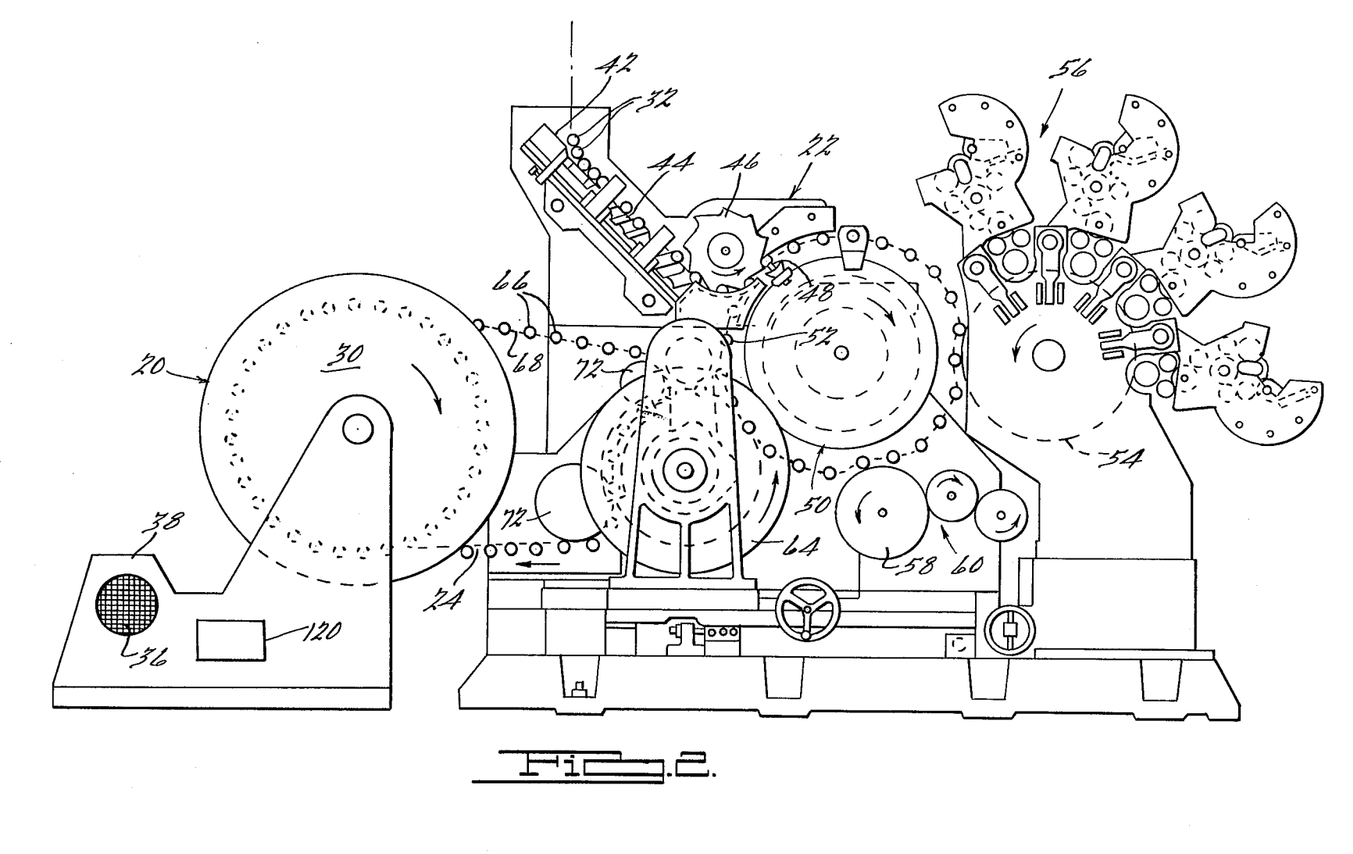
FIG. 2 is a side elevational view, partly schematic, showing the disposition of the operative components of the apparatus shown in FIG. 1.

Referring now in detail to the drawings, and as best seen in FIGS. 1 and 2, a rotary dryer 20 incorporating the preferred embodiments of the present invention is operatively connected to a rotary continuous can printer 22 through an endless transfer chain mechanism 24. The rotary dryer, as illustrated in FIG. 1, comprise a housing 26 within which a plurality of longitudinally extending conveying rails are mounted having their inlet ends disposed adjacent to an input side 28 of the dryer and the outlet ends disposed adjacent to the output end 30 of the dryer, from which the dried articles, such as containers 32, are discharged through a suitable discharge chute 34. Air is drawn into an inlet grill 36 formed in a blower housing 38 at the output end of the rotary dryer and may be suitably heated before discharge into the dryer housing for supporting and conveying the container articles and to further effect a heating and drying thereof during the course of their transfer from the inlet to the outlet ends of the rails. The air after discharge from the rails is exhausted from the housing through an exhaust stack 40 to the atmosphere, or a portion thereof can be recirculated, as may be desired, to conserve the latent heat energy therein.

The continuous can printer is of a type commercially available and is fully described in the United States patents listed in the "Background of the Invention" section of this application; such as, for example, U.S. Pat. No. 3,766,851. As shown in FIGS. 1 and 2, a supply of undecorated containers 32 pass downwardly by gravity via a chute 42 into engagement with a rotatably mounted worm or screw 44 which transfer the containers to a star-wheel 46, by which the containers are placed on cradles 48 mounted at equal circumferentially spaced increments around the periphery of a cradle wheel 50. A corresponding number of horizontal spindles or mandrils 52 are also mounted at the same arcuate increments on the cradle wheel 50, which are disposed in axial alignment with the center of the cradles 48. During the course of the arcuate travel of the containers while supported on the cradle wheel, the containers are transferred from the cradle 48 to the spindles 52, and are decorated upon contact with a rotating image transfer mat 54 of the printing or decorating section of the apparatus which is generally indicated by the numeral 56. Following decoration, and while still mounted on the spindles 52, the containers are coated with a protective varnish coating in response to further arcuate travel and engagement with the periphery of an applicator roll 58, rotatably mounted in an over-varnish unit, indicated generally by the reference numeral 60.

Figure 4:
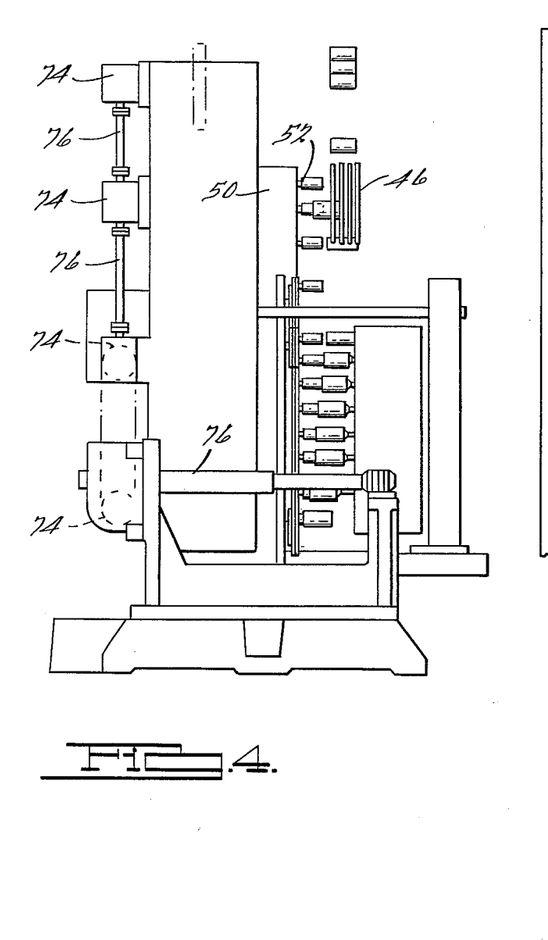
FIG. 4 is an end elevational view, partly schematic, of the rotary decorating apparatus shown in FIG. 1.
Figure 5:
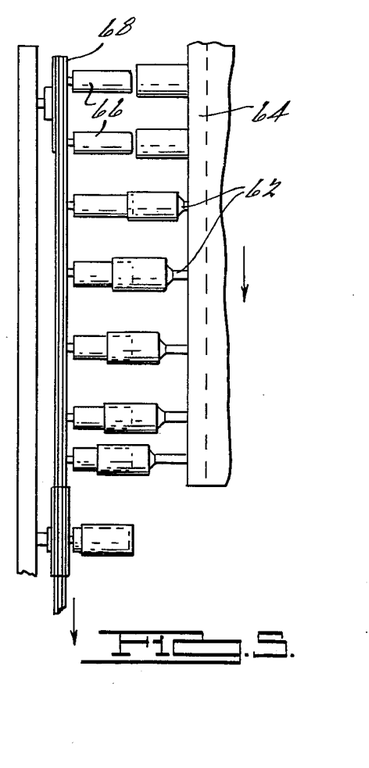
FIG. 5 is a fragmentary plan view of the transfer mechanism for transferring container bodies to the inlet ends of the rails of the rotary dryer.

The containers, with the varnish overcoat thereover, as best shown in FIGS. 4 and 5, are thereafter transferred from the spindles 52 on the cradle wheel 50 to suction cups 62 mounted around the periphery of a transfer wheel 64 rotatably supported on the machine framework and driven in coordinated relationship with the cradle wheel. The containers are carried by the suction cups 62 in an arcuate path and thereafter are axially transferred into engagement with mandrils 66 mounted at longitudinally spaced intervals along a roller chain conveyor 68 extending in a closed path between the transfer wheel and the rotary dryer. The containers, while supported on the mandrils 66, are conveyed to a position in alignment with the air rail assemblies generally indicated at 70 at the input end of the rotary dryer to which they are transferred in a prescribed ordered sequence. The roller chain conveyor and the mandrils thereon pass in a closed-loop pattern over suitable idler sprockets 72 back to the transfer wheel for receiving additional decorated and coated containers.

Figure 3:
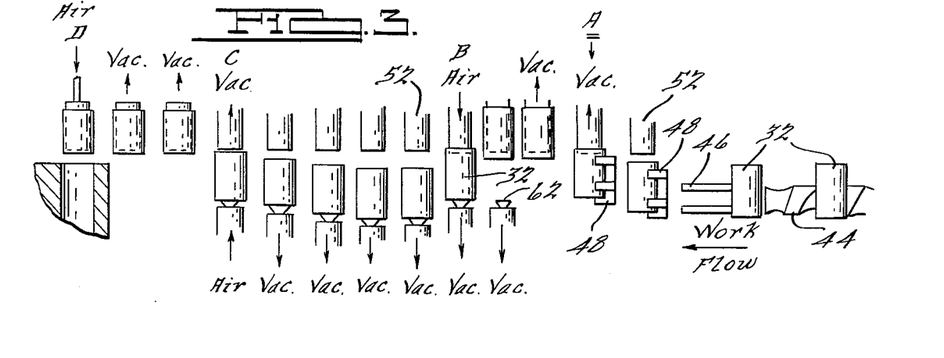
FIG. 3 is a schematic view illustrating the sequence of transfer of container bodies from the decorating apparatus to the transfer wheel and thence to the rotary dryer.

As shown in FIG. 4, the rotation of the worm 44, star wheel 46, cradle wheel 50, transfer wheel 64 and roller chain conveyor 68, are maintained in mechanically synchronized and coordinated relationship by means of a series of gear boxes 74 and connecting shafts 76. The axial shifting movement of the mandrils and suction cups is achieved by cams (not shown) coacting with the movable sections to effect appropriate shifting movement thereof in response to rotation of the various members. The specific sequence of movement of the container from the inlet chute to the rotary can printer and the inlet side of the rotary dryer is schematically illustrated in FIG. 3. As shown, the containers 32 advance from the right toward the left, as viewed in FIG. 3, and are initially transferred by coaction with the worm or screw 44 into engagement with the star wheel 46, whereafter they are placed on a cradle 48 of the cradle wheel and subsequently are axially moved by means of a vacuum applied to the spindles or mandrils 52, such as at the station indicated at "A". Thereafter, vacuum is maintained on the containers supported on the spindles 52 through the printing and overcoating operation, whereafter the coated containers are ejected from the spindles 52, such as by a blast of air at the station indicated at "B" in FIG. 3, and wherein their closed bottom ends are retained by vacuum on a suction cup 62 of the transfer wheel. The containers thereafter are advanced while engaged by suction on the suction cup into axial alignment with mandrils 66 on the roller chain conveyor and the suction cups are cammed outwardly such that the open end of the containers 32 overlie the end portions of the mandrils 66. A vacuum applied to the mandril 66, such as at the station indicated at "C", in combination with a break in the vacuum applied to the suction cups 62, effects axial movement of the container into seated relationship on the mandrils of the chain conveyor. The containers are thereafter transferred toward the left, as viewed in FIG. 3, to a position in alignment with a rail assembly at the input end 28 of the rotary dryer 20 and an axial ejection of the container into the inlet end of an air rail is effected, such as by a blast of air discharged from the end of the mandril 66, at the station indicated at "D" in FIG. 3, whereby the container becomes supported on a cushion of fluid in manner and for the purposes as subsequently to be described.

Figures 6, 7:
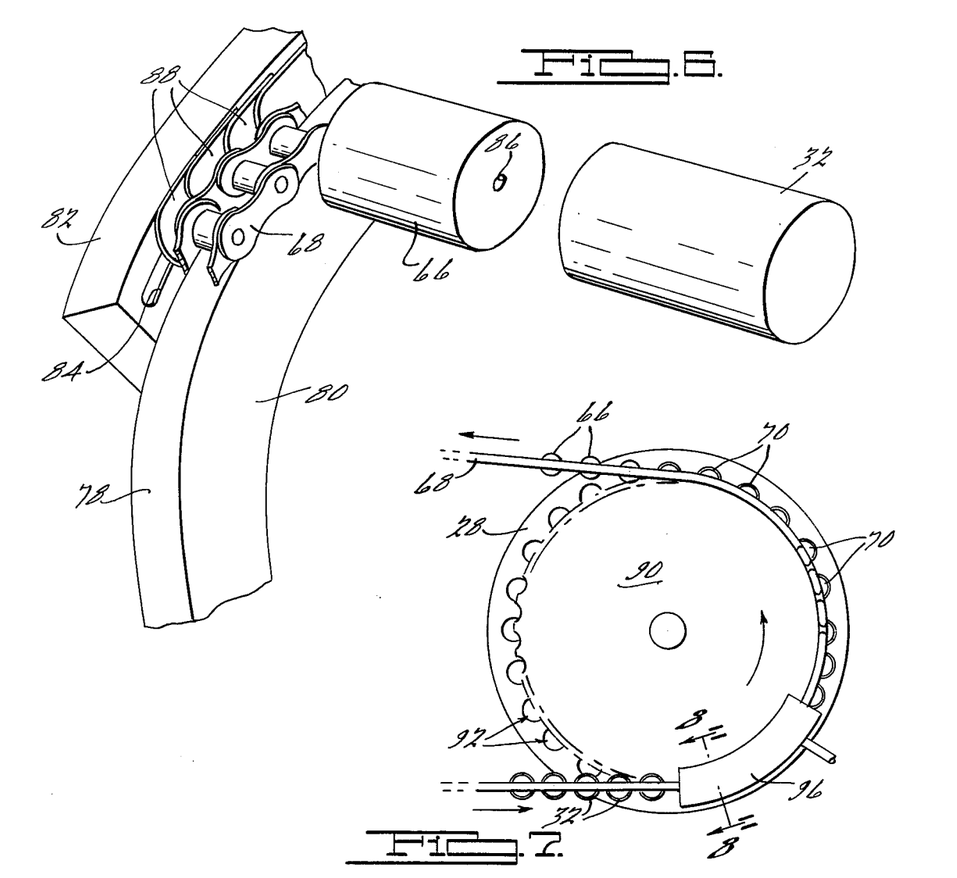
FIG. 6 is a fragmentary perspective view of a portion of the transfer device shown in FIG. 5.
FIG. 7 is a fragmentary rear elevational view of the inlet end of the rotary dryer.

Referring now to FIG. 6 of the drawings, the structural arrangement by which a suitable vacuum is applied to the mandrils 66 of the roller chain conveyor 68 is illustrated. As will be noted, the roller of each link of the roller chain 68 is disposed in rolling supported engagement on the peripheral surface 78 of a cam rail or track 80 having an arcuate curvature corresponding to the circular disposition of the suction cups 62 on the transfer wheel 64. A vacuum manifold 82 is mounted rearwardly of the cam 80 and is formed with an elongated slot or opening 84, which is adapted to be disposed in communication with the tubular rearward end of a suction port 86 extending from the face of the mandril 66 rearwardly through a roller and to the inner face of a series of articulated baffles 88 carried by the roller chain. In accordance with this arrangement, as the roller chain and mandril move such that the suction port 86 is aligned with and disposed in communication with the suction slot 84, a vacuum or suction is applied at the outer face of the mandril, effecting an axial movement of the container 32 from a position in engagement with the suction cups of the transfer wheel to a position in overlying relationship on the mandril.

Figure 8:
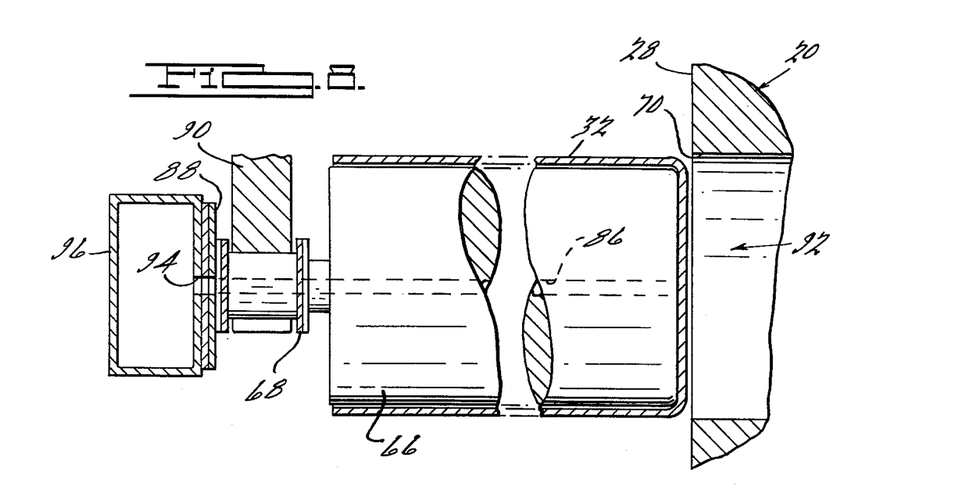
FIG. 8 is a magnified fragmentary side elevational view, partly in section, of the chain-to-rail transfer mechanism as shown in FIG. 7 and as viewed substantially along the line 8—8 thereof.

The arrangement as illustrated in FIG. 6 also corresponds to the structural arrangement whereby a container 32 supported on the mandril 66 is ejected or discharged from the mandril into the inlet end of the rotary dryer 20. This arrangement is more clearly shown in FIGS. 7 and 8 of the drawings. In the specific embodiment shown, a chain sprocket 90 is secured in spaced relationship from the input end 28 of the rotary dryer 20, around which the roller chain 68 and the mandrils 66 thereon are trained. The diameter of the sprocket 90 corresponds substantially to the diameter of the circle on which the inlet ends of the air rail assemblies 92 of the rotary dryer are disposed and the longitudinal distance between the mandrils 66 on the roller chain correspond to the arcuate circumferential increments between adjacent air rail inlets. Accordingly, as the roller chain and the mandrils having a container 32 thereon is advanced into engagement with the sprocket 90, the forward or closed end of the containers, as best seen in FIG. 8, is disposed in spaced axial alignment with the inlet end of the air rail assemblies. Upon further movement of the roller chain around the sprocket in a counterclockwise direction as viewed in FIG. 7, the port 86 extending axially through the mandril and the roller chain and articulated baffle 88 at the rearward end thereof, becomes disposed in communication with a slot 94 formed in the face of a pressure plenum 96, whereby a high pressure blast of air is discharged through the port, effecting a propulsion of the container axially off the mandril 66 and into the inlet end of the air rail. The roller chain and sprocket 90 continue to rotate in synchronization with rotary dryer 20 and thereafter roller chain conveyor is disengaged and returns to a position adjacent to the suction cups of the transfer wheel for reloading with freshly decorated containers.

Figure 9:
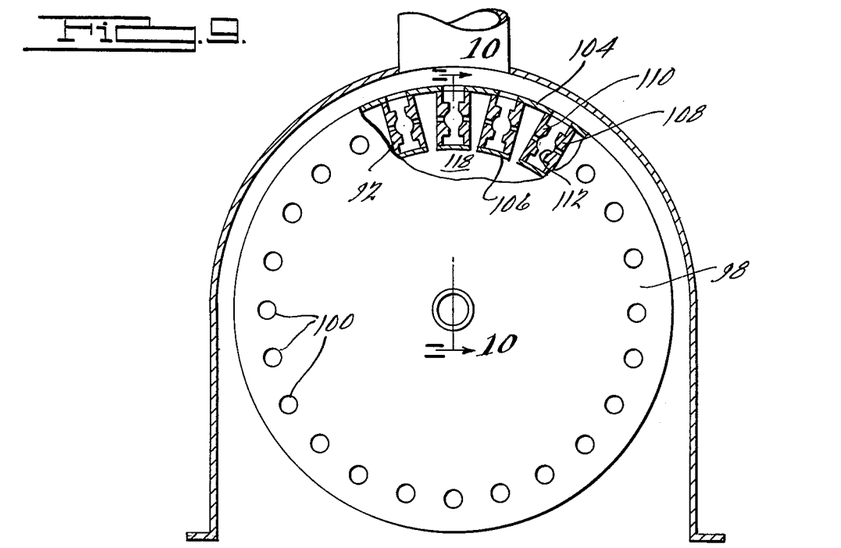
FIG. 9 is an end elevational view, partly in section, of the rotary dryer device.
Figure 10:
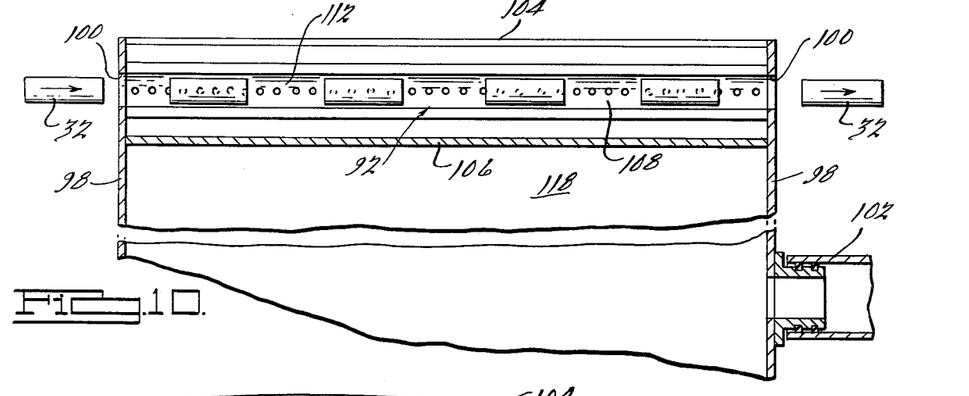
FIG. 10 is a magnified longitudinal view through a rail of the rotary dryer shown in FIG. 9 as taken substantially along the line 10—10 thereof.

In accordance with the arrangement as hereinbefore described, the containers are sequentially and in ordered sequence, introduced into the input end of the rotary dryer mechanism and in supported relationship on a cushion of fluid during their longitudinal travel along the air rail from the inlet end to the outlet end thereof. The rotation of the rotary dryer is performed in synchronization with the operation of the rotary printing apparatus and the rotative speed can be coordinated through the roller chain conveyor itself or by suitable drive shafts and gear box arrangements of the type previously described in connection with FIG. 4. The rotary dryer, as best seen in FIGS. 9 and 10, comprises a framework consisting of a pair of circular end walls 98 which are formed with a plurality of circular openings or ports 100 disposed in a circular pattern at substantially equal circumferentially spaced increments defining the inlet and outlet ends of the air rail assemblies extending between the inner surfaces of the end walls. The end wall 98, defining the output end of the rotary dryer, is supported on a hollow tubular shaft 102, which is connected to the discharge side of the blower housing 38 (FIG. 1), whereby a high pressure fluid, such as air, is introduced into the interior of the dryer framework.

As shown in FIGS. 9 and 10, a slotted outer cylindrical member 104 and a slotted inner cylindrical member 106 are disposed in concentric relationship and are affixed at their opposite ends to the inner surfaces of the end walls 98. Each air rail assembly 92 is comprised of a pair of longitudinally extending members 108, 110, each of which is formed with a partial circular longitudinally extending supporting surface 112, which is of a radius corresponding generally to the radius of the tubular article or container 32. In the specific embodiment shown, the supporting surfaces 112 are positioned in opposed relationship and are spaced a distance slightly greater than the diameter of the periphery of the container 32, providing an annular clearance space, indicated at 114 in FIG. 11, which is adapted to be filled with air so as to support the container on a substantially frictionless cushion of fluid.

Figure 11:
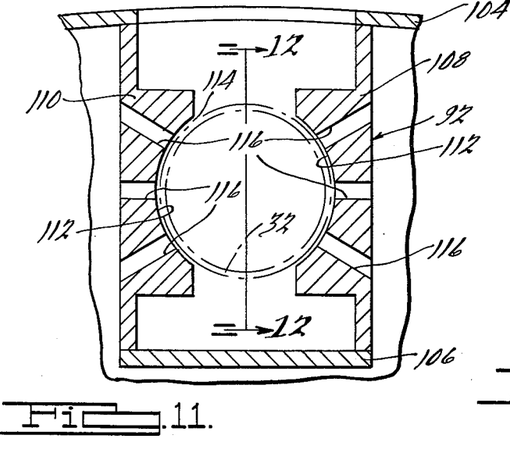
FIG. 11 is a magnified transverse fragmentary sectional view of an air rail assembly as shown in FIG. 9.

The members 108, 110 are provided in the region of their supporting surfaces 112 with a plurality of apertures or ports 116, which are positioned in a triangular pattern with the longitudinal axis of each port oriented substantially perpendicular to a plane tangent to the curvature of the arcuate supporting surface 112. The other ends of the ports, as best seen in FIGS. 9-11, are disposed in communication with the interior of the rotary dryer comprising a supply chamber 118 connected to the hollow tubular shaft 102 for receiving a supply of pressurized fluid, such as air. The foregoing arrangement provides for a substantially uniform or a controlled variable distribution of air or other gaseous fluid along the entire length of the air rail assembly, whereby the containers are maintained in spaced supported relationship relative to the supporting surface during their longitudinal travel between the inlet and outlet ends of each air rail assembly. When employing the rotary dryer 20 for drying and/or curing the coatings on the periphery of the decorated containers, a heating of the air introduced into the supply chamber 118 for subsequent discharge from the ports in the rail assemblies is preferably achieved, such as by incorporating a burner assembly 120 connected directly to the blower housing 38 as shown in FIG. 1. Alternatively, steam, electrical heating units or the like, can be employed for heating the ambient air to the desired temperature level to achieve the requisite drying and/or curing characteristics of the coated articles.

Figure 12:
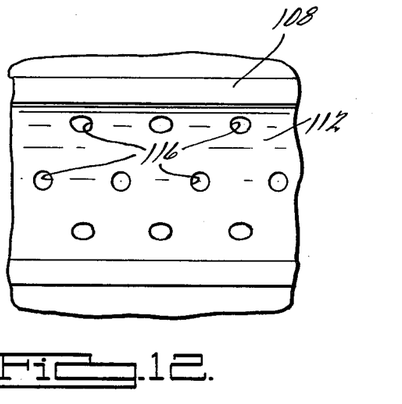
FIG. 12 is a magnified fragmentary plan view of the supporting surface of one rail member of the rail assembly shown in FIG. 11 and taken substantially along the line 12—12 thereof.
Figures 13, 14, 15, 16, 17:
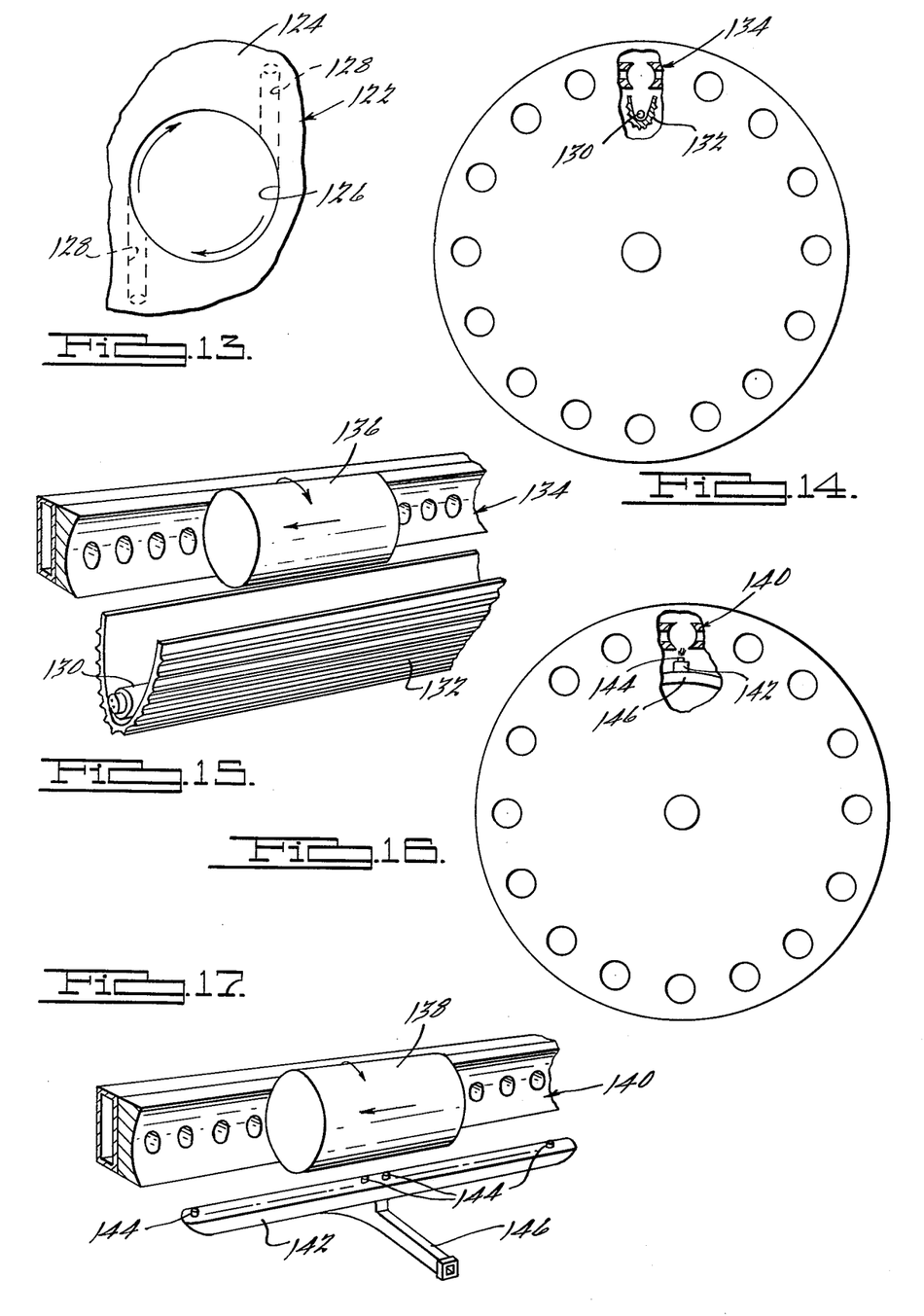
FIG. 13 is a magnified fragmentary plan view of a rail member incorporating an alternative type discharge port therein.
FIG. 14 is a schematic end view, partly in section, illustrating the use of a radiation device adjacent to the rail assembly for effecting a drying or curing of the decorative coating on a container.
FIG. 15 is a fragmentary perspective view with portions thereof broken away illustrating the radiation system illustrated in FIG. 14.
FIG. 16 is an end elevational view, partly schematic and partly in section, illustrating the use of a direct flame impingement arrangement for augmenting the drying and/or curing of decorative coatings on the container.
FIG. 17 is a fragmentary perspective view with portions thereof broken away illustrating the relationship of a burner mechanism adjacent to the air rail assembly.

In addition to discharging the pressurized fluid in a substantially axial direction in impinging relationship against the side wall surfaces of the containers in accordance with the porting arrangement illustrated in FIGS. 11 and 12 of the drawings, it is also contemplated that the pressurized fluid can be discharged in a helical flow pattern in accordance with the structural embodiment as illustrated in FIG. 13. As shown, a rail member 122 having an arcuate supporting surface 124 is formed with a cavity 126 of a substantially circular cylindrical configuration extending inwardly of the supporting surface a portion of the thickness of the rail member. The base of the cavity 126 is connected by one or a plurality of ports or nozzles 128, which are disposed with their inner ends in communication with the supply chamber comprising the interior of the dryer framework, such that a pressurized fluid is introduced into the cavity 126 in a direction tangential to the cylindrical wall of the cavity, causing the air to travel in a circular flow pattern, as indicated by the arrows in FIG. 13, during its axial travel outwardly of the cavity. The resultant helical flow pattern produces a differential pressure pattern in a plane defined by the supporting surface at the outlet of the cavity, which has a lower pressure in the central portion thereof and a higher pressure around the periphery thereof, imparting a so-called push-pull force on the tubular article supported on the cushion of fluid adjacent to the cavity. The helical flow pattern of the vortex is more fully described in U.S. Pat. No. 3,782,791, the substance of which is incorporated herein by reference. The specific orientation of the ports or nozzles 128 can be made so as to impart a directional force or component in the discharged fluid tending to propel the container along the air rail assembly from its inlet end to the outlet end thereof.

In addition to employing heated air to effect a drying and/or cutting of the decorative coating, it is also contemplated that an acceleration of the drying or curing cycle can be effected by a direct flame impingement on the containers, the use of ultraviolet or infrared radiation, the use of electron beams, the use of catalysts such as gaseous ammonia, for example, to effect an acceleration of the cure of the printing ink, and the like. As an illustration of the use of ultraviolet or infrared radiation, the arrangement of FIGS. 14 and 15 is provided, wherein an elongated radiation element 130 is positioned within a parabolic reflector 132 and extends for at least a portion of the length of an air rail assembly 134. The coated surface on the exterior side walls of a container 136 is subjected to radiation during the course of its travel along the air rail assembly 134, while simultaneously rotating, exposing all sections of the coating to radiation.

In an alternative arrangement as illustrated in FIGS. 16 and 17, a coated container 138, while rotationally supported on an air rail assembly 140, is subjected to direct flame impingement by passing over a burner assembly 142 having a plurality of flame orifices 144 disposed in spaced longitudinal intervals therealong. The burner assembly 142 is supported on an arcuate frame 146, which also serves as a supply conduit for the combustible gas mixture.

In addition to effecting a curing operation, it is also contemplated that a treatment of the containers can be performed while supported on the air rail assemblies. For example, the fluid discharged from the ports in the air rail assemblies can incorporate entrained particulate materials which can be deposited with the assistance of electrostatic deposition on the surfaces of the containers performing a coating treatment. It is also contemplated that suitable spray nozzles can be incorporated in the air rail assemblies themselves or adjacent thereto for spray-applying liquids and/or solid particulate coatings on the surfaces of the tubular articles.

Figures 18, 20:
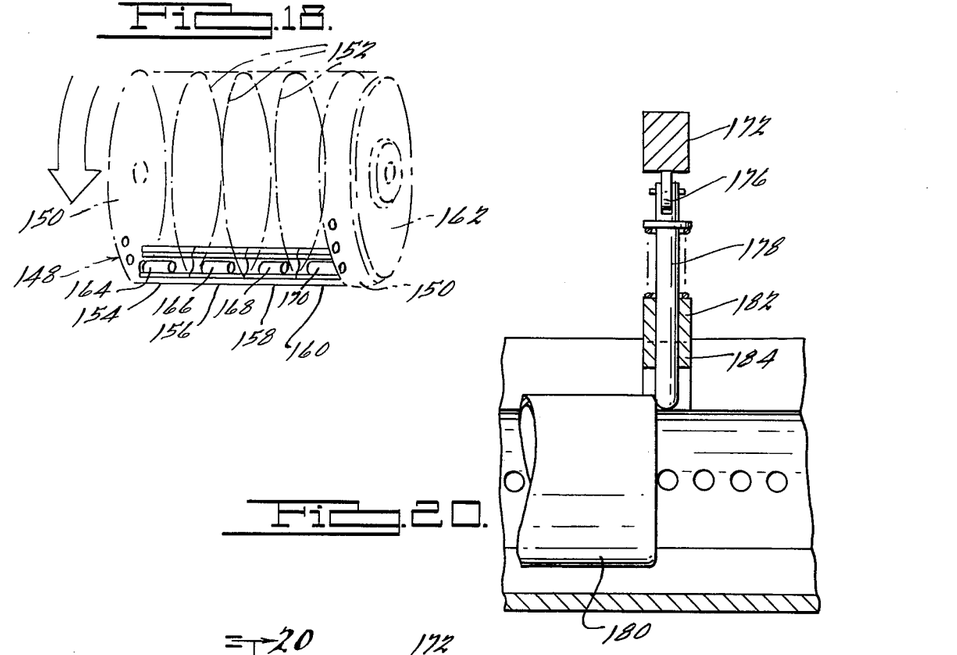
FIG. 18 is a schematic perspective view illustrating the disposition of four containers on an air rail assembly of the rotary dryer in order to achieve a four-stage drying or curing operation.
FIG. 20 is a fragmentary longitudinal vertical sectional view of the mechanical escapement as shown in FIG. 19, as viewed substantially along the line 20—20 thereof.

Referring now to FIG. 18, a typical operating cycle will be described for effecting a four-stage drying and/or curing of decorative coatings on tubular articles. For this purpose, a rotary framework 148 of the dryer apparatus is schematically illustrated, including the end walls 150 and further including three intervening partitions, indicated in phantom at 152, for dividing the interior chamber into four separate plenums, each disposed in communication with a separate air supply. The first chamber, indicated at 154, at the input end of the dryer, may conveniently be connected to a heated air supply at the highest elevated temperature, providing the hottest zone or stage to initiate the curing or drying operation. The next or second zone 156 may conveniently be connected to a heated air supply of an intermediate temperature, providing a drying zone at a somewhat lower temperature, while the third zone 158 is connected to a third air supply of a moderate or warm temperature. Finally, the fourth or last zone, indicated at 160, is conveniently connected to a fourth air supply of a cool temperature for effecting a cooling of the container prior to its discharge from the output end of the rotary dryer. It will also be observed that a discharge wheel 162 is provided adjacent to the output end of the rotary dryer for receiving the containers from the outlet ends of the plurality of air rail assemblies.

Further with reference to FIG. 18, each of the plurality of air rail assemblies in the rotary dryer has four containers positioned in each of the respective four drying zones thereof. The individual containers, indicated at 164, 166, 168 and 170, respectively, are maintained in appropriate longitudinally spaced relationship by means of the action of the air discharged from the air rail assemblies, forming an air cushion so as to maintain the ends of the adjacent articles in appropriate spaced relationship. In lieu of such an air cushion spacing effect, appropriate mechanical devices can be employed for maintaining the containers within their respective zone during each revolution of the rotary dryer. Typically, at a constant feed rate of about 600 decorated containers per minute, a rotary dryer of the type illustrated in FIG. 18 incorporates 20 separate air rail assemblies, each having four separate drying zones, and wherein the rotary dryer rotates at a speed of 30 revolutions per minute. On each complete revolution, a freshly decorated container is introduced into the inlet end and first zone 154 of the dryer, while a container having the coating completely dried and/or cured is removed by the discharge wheel from the fourth or last zone 160 of the dryer. The containers in the air rail itself are advanced one zone during each revolution of the dryer. Accordingly, each container is subjected to an eight second duration curing or drying cycle during four revolutions of the rotary dryer.

Figure 19:
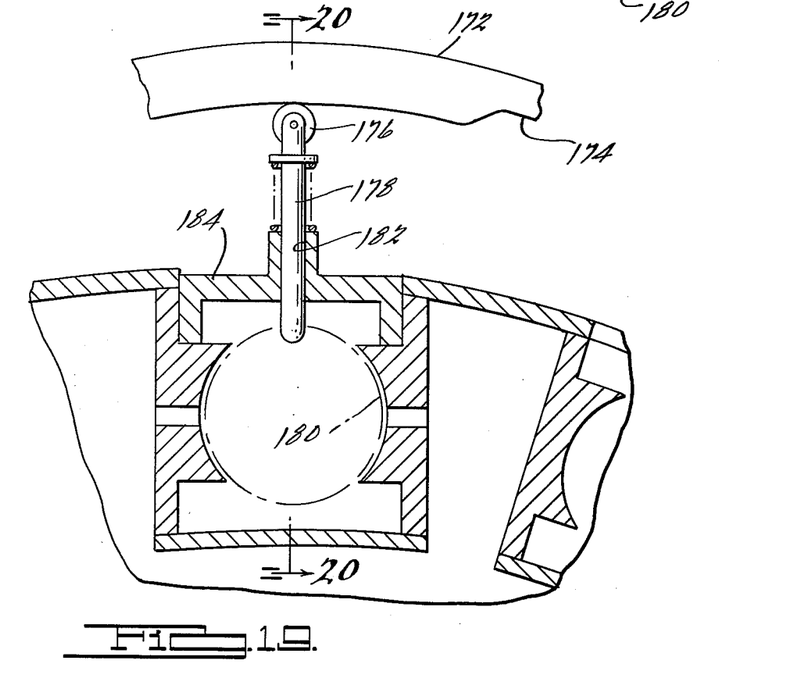
FIG. 19 is a transverse fragmentary sectional view illustrating a mechanical escapement for retaining individual containers in the appropriate drying zone.

A mechanical plunger escapement arrangement for maintaining individual containers in appropriate zones along the air rail assembly is illustrated in FIGS. 19 and 20. As shown, a circular cam track 172 is stationarily positioned around the rotary dryer at a position corresponding substantially to the outlet end of a dryer zone. The cam track is provided with radially recessed sections 174, permitting a cam follower 176 to move outwardly along with its associated resiliently-biased plunger 178 in response to relative rotation of the drum with respect to the cam track so as to effect a retraction of the plunger from a blocking position as shown in solid lines in FIG. 19 to a radially retracted position disposed in clearance relationship with respect to the forward end of a container 180. The cam follower and plunger arrangement are mounted for reciprocal movement in a tubular boss 182 supported on a U-shaped bridge member 184 extending transversely of the air rail assembly and affixed to the rail members thereof. Upon retraction of plunger 178, each container is advanced to the next adjacent zone and upon attaining that position, is again retained by the inward blocking movement of the cam follower and plunger mechanism. The longitudinal movement of the containers is effected by the thrust of the air discharged from the air rail and may be further supplemented by directionally oriented jets promoting translatory movement of the containers.

Figures 21, 22, 23, 24:
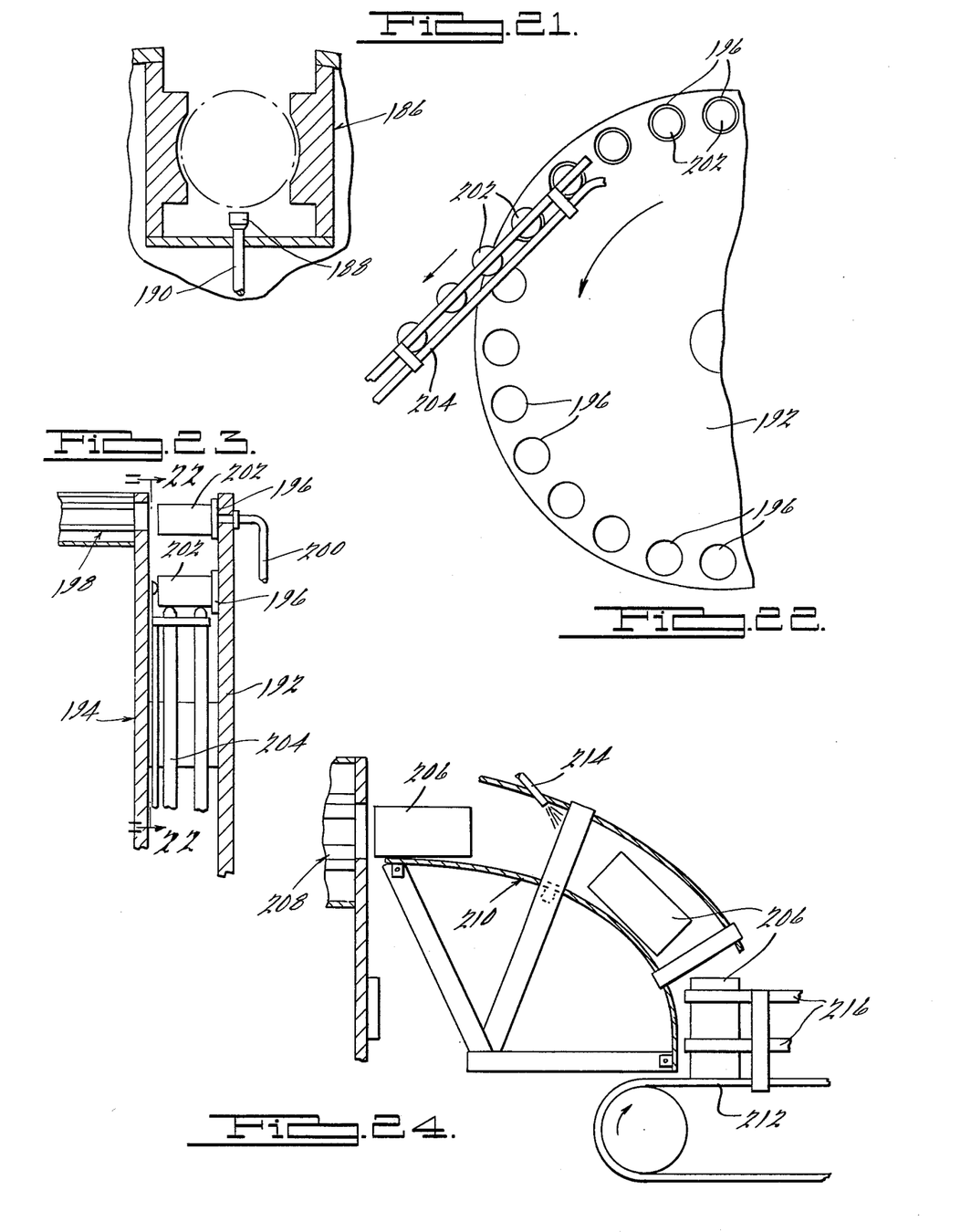
FIG. 21 is a fragmentary end elevational view, partly in section, of a rotary dryer illustrating an air knife escapement arrangement.
FIG. 22 is a fragmentary transverse sectional view illustrating the discharge wheel for receiving the tubular articles upon discharge from the rotary dryer as viewed substantially along the line 22—22 of FIG. 23.
FIG. 23 is a fragmentary longitudinal vertical sectional view of the discharge end portion of the dryer and the discharge wheel and track for receiving the processed containers.
FIG. 24 is a side elevational view, partly in section, illustrating an alternative satisfactory arrangement for receiving the containers discharged from the output end of the dryer.

It is also contemplated that in lieu of a mechanical escapement arrangement as shown in FIGS. 19 and 20 of the drawings, appropriate separation of the containers in the individual zones of the rotary dryer can be effected by an air knife, as illustrated in FIG. 21. As shown, an air rail assembly 186 of the same type previously described is provided with a nozzle 188 connected to a high pressure supply of air 190. The nozzle 188 preferably is of a fan-shaped configuration so as to discharge a curtainous stream of air transversely of the path of travel of the containers, forming a barrier which prevents penetration of the container therebeyond. Suitable valving means are incorporated in the supply network 190 for periodically interrupting the blast of air from the nozzle 188, permitting advancement of the containers from one zone to the next adjacent zone. The nozzles 188, as in the case of the cam follower and plunger arrangement as described in connection with FIGS. 19 and 20, is appropriately located at a position corresponding to the outlet end of each individual drying zone.

A removal of the containers from the last zone of the rotary dryer can be achieved by a variety of techniques, such as shown in FIGS. 22 and 23. In the arrangement as illustrated, a discharge wheel 192 is rotatably mounted in fixed relationship with respect to the rotary dryer 194, and is formed with a plurality of resilient suction disks 196 at circumferentially spaced increments therearound which are oriented so as to be in axial alignment with the discharge ends of air rail assemblies 198. Each suction disk is connected to a suitable suction source through a conduit 200, whereby a container 202 impinging thereagainst is retained in appropriate position on the suction disk until it coacts with a track or chute 204 stationarily mounted and inclined at an angle substantially tangent to the circular pattern of suction disks on the discharge wheel. It is also contemplated that the conduit 200 can be equipped with suitable valving for discontinuing the suction at the instant that the container 202 contacts the guide tubes of the chute 204, facilitating a stripping of the container from the discharge wheel.

It is also contemplated when tubular articles of a ferrous construction are processed, to employ magnetic disks in lieu of the suction disks for retaining the tubular articles on the discharge wheel during rotation thereof to a position for discharging the articles into the chute. For this purpose, permanent magnets or electromagnets selectively energizable can be employed for retaining the ferrous tubular articles in appropriate position.

Alternatively, a waterfall-type chute and conveyor system can be employed for receiving the containers from the discharge or outlet end of the rotary dryer. Such an arrangement is illustrated in FIG. 24, in which containers 206, upon discharge from the air rail assembly 208, slidably enter an arcuate chute 210 of a length and curvature corresponding substantially to the trajectory of the articles at their discharge velocity and terminating at a discharge side adjacent to a conveyor belt 212. The arcuate travel of the containers 206 from the outlet end of the air rail can be assisted by incorporating an air jet 214 at a position intermediate of the arcuate chute 210 from which a high pressure air is intermittently or continuously discharged for propelling the containers toward the conveyor belt 212. The conveyor is provided with suitable side rails 216 to maintain the containers in an upright position.

While it will be apparent that the invention as herein described is well calculated to achieve the benefits and advantages as hereinabove set forth, it will be appreciated that the invention is susceptible to modification, variation and change without departing from the spirit thereof.

What is claimed is:

1. A rotary conveying device for circular cylindrical articles comprising a framework, a plurality of conveying rails fixedly supported on said framework in longitudinally extending spaced substantially parallel relationship and arranged with the inlet and outlet ends thereof on a circle in equal circumferentially spaced increments, means for supporting said framework for rotation about an axis extending through the center of the circle on which said inlet and outlet ends are arranged, means for rotating said framework and said rails thereon, transfer means for transferring articles into said inlet ends of said rails in sequential ordered sequence, and receiving means for receiving articles discharged from said outlet ends of said rails in sequential ordered sequence, each of said rails comprising a member fixedly supported on said framework and having a supporting surface formed with a plurality of cavities extending in longitudinally spaced relationship therealong, fluid supply means on said framework disposed in communication with said cavities for supplying a fluid thereto for discharge from said cavities outwardly beyond the supporting surface and against the articles on said rail for supporting the article in translatory spaced relationship from said supporting surface on a cushion of said fluid.

2. The rotary conveying device as described in claim 1, in which said fluid supply means are operatable for supplying a gas for discharge from said cavities.

3. The rotary conveying device as described in claim 1, in which said fluid supply means are operatable for supplying air for discharge from said cavities.

4. The rotary conveying device as described in claim 1, further including heating means for heating the article while supported in translatory spaced relationship on said rails.

5. The rotary conveying device as described in claim 4, wherein said heating means comprises means for heating said fluid discharged from said cavities and in contact with the article supported on said rails.

6. The rotary conveying device as described in claim 4, wherein said heating means comprises a flame of combustible gases disposed adjacent to said rails for heating the articles supported thereon.

7. The rotary conveying device as defined in claim 4, wherein said heating means are arranged in longitudinally extending sections along said rails to effect a different degree of heating of the articles during passage along each of said sections.

8. The rotary conveying device as defined in claim 7, in which the section adjacent to the inlet end is heated to the highest temperature and the section adjacent to the outlet end of the rail is heated to the lowest temperature.

9. The rotary conveying device as defined in claim 8, further including means for retaining each article in an individual one of said sections for substantially one revolution of said framework.

10. The rotary conveying device as described in claim 1, further including means for subjecting the articles to radiation while supported on said rails.

11. The rotary conveying device as described in claim 1, further including means for subjecting the articles to ultraviolet radiation while supported on said rails.

12. The rotary conveying device as described in claim 1, further including means for subjecting the articles to infrared radiation while supported on said rails.

13. The rotary conveying device as described in claim 1, in which said fluid supply means further includes means for introducing a treating agent into said fluid for contact with the surfaces of the articles.

14. The rotary conveying device as described in claim 1, wherein said fluid supply means is operatable for supplying air for discharge from said cavities and further includes means for introducing a treating substance in admixture with said air.

15. The rotary conveying device as described in claim 14, in which said treating substance comprises ammonia.

16. The rotary conveying device as described in claim 1, in which said transfer means comprises a plurality of mandrils movable in synchronization with said inlet ends of said rails for supporting the articles thereon in axially aligned relationship with said rails, and means for propelling said articles from supported relationship on said mandrils into said inlet ends of said rails.

17. The rotary conveying device as described in claim 16, in which said mandrils further include nozzle means in the base thereof and pressurized fluid means in communication with said nozzle means for propelling the articles from said mandrils.

18. The rotary conveying device as described in claim 16, in which said mandrils are mounted at spaced intervals to a flexible element movable in synchronization along a path concentric with the circle on which said inlet ends of said rails are disposed.

19. The rotary conveying device as described in claim 1, in which said receiving means comprises a member disposed in axially spaced relationship from said outlet ends of said rails and formed with a plurality of engaging means thereon for receiving and engaging articles discharged from said outlet ends of said rails.

20. The rotary conveying device as described in claim 19, in which said engaging means comprise suction cups connected to a source of reduced pressure for engaging and retaining by suction the base of the cup-shaped articles.

21. The rotary conveying device as described in claim 19, in which said engaging means comprise magnets for magnetically engaging the base of the cup-shaped articles.

22. The rotary conveying device as described in claim 1, wherein said receiving means comprises an arcuate chute of a configuration and length corresponding substantially to the trajectory of the articles discharged from the outlet ends of said rails for guidably receiving said articles, and conveying means disposed at the outlet of said chute for receiving the articles therefrom.

23. The rotary conveying device as described in claim 1, further including means disposed intermediate of said inlet and said outlet ends for dividing each of said rails into a plurality of zones, said supply means including means for supplying a separate fluid to said cavities of each of said zones.

24. The rotary conveying device as described in claim 1, further including stop means disposed intermediate of said inlet ends and said outlet ends of each of said rails for retaining articles in substantially fixed translatory disposition along said rails for a portion of the rotary movement of said framework and means for disenabling said stop means enabling passage of the articles toward said outlet ends.

25. The rotary conveying device as described in claim 24, in which said stop means comprises a plunger mounted for reciprocal movement to and from an operative position in blocking disposition relative to articles supported on said rail and an inoperative position disposed in clearance relationship relative to the articles, and cam means for reciprocally moving said plunger to and from said operative and inoperative positions in response to rotation of said framework.

26. In an apparatus for decorating cup-shaped cylindrical articles including in-feed conveying means for loading undecorated articles on a plurality of support elements mounted on a rotatable carrier in circumferentially spaced intervals and decorator means disposed adjacent to the arcuate path of travel of the articles while supported on the support elements to apply a decorative coating to the surfaces of the undecorated articles, the improvement comprising rotary drying means for receiving the decorated articles from the support elements upon completion of decoration for drying the decorative coatings thereon, said rotary drying means comprising a framework, a plurality of conveying rails supported on said framework in longitudinally extending spaced substantially parallel relationship and with the inlet and outlet ends thereof arranged in a circular pattern in equal circumferentially spaced increments, means for supporting said framework for rotation about an axis extending through the centers of the circles on which said inlet and outlet ends are arranged, means for rotating said framework and said rails in coordinated relationship with the discharge of the decorated articles from the supporting elements, transfer means for transferring decorated articles from the support elements into said inlet ends of said rails in sequential ordered sequence, and receiving means for receiving articles discharged from said outlet end of said rails in sequential ordered sequence, each of said rails comprising a member having a supporting surface formed with a plurality of cavities extending in longitudinally spaced relationship therealong, fluid supply means on said framework disposed in communication with said cavities for supplying a fluid thereto for discharge outwardly from said cavities beyond the supporting surface and against the surface of an article on said rail for supporting the article in translatory spaced relationship from said supporting surface on a cushion of fluid.

* * * * *